United States Patent [19]

Veenhof

[11] Patent Number: 4,662,507
[45] Date of Patent: May 5, 1987

[54] BELT SCRAPING DEVICES ACCOMMODATING A REVERSING CONDITION

[76] Inventor: Willem D. Veenhof, 4501 Soundside Dr., Gulf Breeze, Fla. 32561

[21] Appl. No.: 719,350

[22] Filed: Apr. 3, 1985

[51] Int. Cl.$^4$ ............................................. B65G 45/00
[52] U.S. Cl. .................................... 198/499; 15/256.5
[58] Field of Search ............... 198/499, 497, 496, 498; 15/256.51, 256.5

[56] References Cited

U.S. PATENT DOCUMENTS

| 2,227,776 | 1/1941 | Anderson | 198/497 |
| 2,878,926 | 3/1959 | Harty et al. | 198/497 |
| 3,047,133 | 7/1962 | Searles | 198/499 X |
| 3,841,470 | 10/1974 | Meguro | 198/499 |
| 3,994,384 | 11/1976 | Reiter | 198/497 |
| 4,036,354 | 7/1977 | Reiter | 198/499 |
| 4,349,098 | 9/1982 | Veenhof | 198/499 X |
| 4,498,577 | 2/1985 | Veenhof | 198/499 |

FOREIGN PATENT DOCUMENTS

| 801144 | 12/1950 | Fed. Rep. of Germany | 198/499 |
| 1575879 | 7/1969 | France | 198/499 |
| 707907 | 4/1954 | United Kingdom . | |
| 1433659 | 4/1974 | United Kingdom . | |
| 1548051 | 7/1979 | United Kingdom . | |

| 481506 | 12/1975 | U.S.S.R. | 198/498 |
| 719940 | 3/1980 | U.S.S.R. | 198/498 |

Primary Examiner—Joseph E. Valenza
Assistant Examiner—Jonathan D. Holmes
Attorney, Agent, or Firm—Glaser, Griggs & Schwartz

[57] ABSTRACT

A conveyor belt scraper assembly includes an array of transversely extending, flexible scraper members engaging, in an operative position, a conveyor belt surface to be cleaned. Each flexible scraper is resiliently biased in frictional engagement with the curved surface of the conveyor belt by a tension spring. The scraper members are supported in the operative position by upper and lower crossbar support members. In the preferred embodiment, the upper crossbar support member is articulated or segmented. The separate crossbar portions are independently rotatable from a nominal resting position in which the associated scraper member is held in helical engagement with the conveyor belt. The segmented crossbar portions are pivotally mounted onto an axle and are rotatable through an arc of approximately 90°, thereby permitting each segmented crossbar portion to move outwardly away from the surface of the conveyor belt to allow passage of a lump, bulge or protrusion, thus avoiding damaging contact between the protruding conveyor belt and the crossbar during a reversing condition.

6 Claims, 7 Drawing Figures

BELT SCRAPING DEVICES ACCOMMODATING A REVERSING CONDITION

FIELD OF THE INVENTION

This invention relates to cleaning or scraping devices utilized for removing material which adheres to a conveyor belt or pulley drum.

BACKGROUND OF THE INVENTION

In the operation of bulk material conveyors, a belt scraper assembly is provided for removing adhering material from the conveyor belt and depositing it into a discharge area. In the absence of a cleaning device, or as a result of a poorly functioning belt scraper, carry-over will be accumulated beneath the conveyor belt. In addition to constituting a nuisance, a large amount of valuable product will be deposited beneath the conveyor and may build-up sufficiently to interfere with operation of the conveyor. For example, a volume of spillage material 1/16" (1.6 mm) deep and 1" (25 mm) wide will produce approximately 2½ cubic feet (0.075 cubic meters) of carry-over per 100 feet per minute (0.48 meters per second) of belt speed each hour. At a conveyor speed of 500 feet per minute (2.5 meters per second), this small stream produces approximately 10 tonnes of carry-over spillage every eight hours, based on a density of 100 lbs per cubic foot (1500 kg/cubic meter).

Consequently, there is considerable interest in improving the operation and efficiency of conveyor belt cleaning devices. Conventional conveyor belt cleaning devices generally include one or more blades disposed in a plane transverse to the conveyor belt and are urged toward the belt so as to cause engagement of an edge of the blade with the belt surface. Such conveyor belt cleaning devices must be located rearwardly of the head pulley drum on the return path of the conveyor belt so that sufficient flexibility in the belt is provided to permit transverse movement thereof when protruding objects pass the cleaning device. For example, the belt cleaning device is hampered constantly by obstructions such as mechanical fasteners at high speeds, which are often driven by hundreds of horsepower. Moreover, if the belt reverses, the reverse movement of the conveyor belt can drive the blades into the belt and cause tearing of the conveyor belt and damage to the scraper. This problem occurs frequently on inclined conveyors where the hold back allows the belt to reverse even a few inches before locking. It also occurs when a traveling tripper is moved forward when the belt is stopped.

DESCRIPTION OF THE PRIOR ART

Among the various improved belt scrapers which have been proposed or are now in use are conveyor belt scrapers as disclosed by Willem Dirk Veenhof in U.S. Pat. Nos. 4,349,098 and 4,498,577. According to those arrangements, a conveyor belt cleaning assembly includes a plurality of wear resistant scraper elements mounted on a flexible tension member for yieldable engagement with the curved surface of the conveyor belt. This belt cleaner assembly is located beneath the overhang defined by the discharge pulley drum. The cleaner assembly includes two crossbars and an array of diagonally extending cleaning members mounted between the crossbars. Each flexible tension member and associated scraper elements are held in a helical course of engagement with the curved surface of the conveyor belt. An uppermost crossbar is located inwardly of the overhang portion of the pulley so that conveyed material will not wedge between the belt surface and the bar. The lower crossbar is located near the tangent line of the belt and pulley. The arcuate course followed by the separate cleaning members closely conforms with the curved surface of the conveyor belt. Elastic tension induced in each flexible cleaning member translates into a yieldable thrust applied against the conveyor belt surface.

In the arrangement disclosed in U.S. Pat. No. 4,498,477, each cleaning member is composed of a series of scraper discs of tungsten carbide material threaded onto a flexible cable. The scraper elements are separated by scraper springs. The spacer springs have the scraper element perpendicular to the belt surface but allow the elements to deflect to permit obstructions, such as mechanical fasteners, to pass without snagging or damaging the belt or the scraper assembly.

The foregoing conveyor belt scraper assemblies have have been proven effective and efficient in cleaning conveyor belt surfaces in a wide variety of applications. However, a potentially damaging situation has been encountered in the operation of a discharge pulley drum where the conveyor design allows the return or bottom portion of the belt to approach the discharge pulley, that is, a reversing belt condition. More specifically, lumps of discharge material can under some circumstances become trapped between the conveyor belt and the pulley drum when the belt reverses over the pulley. A reversing belt condition can occur in the operation of (1) reversible conveyors; (2) single direction conveyors with a "traveling tripper", with the belt reversing over the pulley if the tripper is moved forward while the belt is stopped; and, (3) in the operation of single direction conveyors having a telescoping discharge section.

In the "traveling tripper" situation, the belt is stationary, and the tripper is moved forward, with the effect being the same as if the belt were running in reverse over the pulleys although the belt is stationary. In the telescoping head section situation, the belt is stationary but the pulley is moving relative to the belt, with the end section telescoping. With the belt stationary and the end section telescoping, the effect is the same as if the belt were moving in reverse over the pulley.

In each of the foregoing situations, during an operation that has the effect of the belt moving in reverse with respect to the pulley drum, there is a possibility that stones or other lumps of material may be carried along on the inside surface of the conveyor belt and become trapped between the conveyor belt and the face of the pulley drum. This typically occurs when stones or other lumpy material falls from the top surface of the conveyor belt, and bounce off of the conveyor structure and fall upon the inside surface of the lower return portion of the conveyor belt. As the conveyor belt moves in reverse direction over the pulley, the stones or other lumpy material become confined and pinched between the belt and the face of the pulley drum, with the captured stones or other material forming a lump or bulge in the belt.

The lower or rear crossbar which supports the scraper elements is located far enough from the tangent line of the belt and pulley to allow a large lump, for example a lump causing a belt projection of 2" (50 mm), to pass over it without interference. The upper or front crossbar of the cleaner assembly, however, is preferably maintained in very closely spaced relation with respect to the face of the conveyor belt, for example approximately ¾" (20 mm) clearance. It will be appreciated that during such reversing belt conditions, lumps of material could protrude sufficiently to cause the belt to engage the upper crossbar and thereby damage the scraper frame, and possibly tear the conveyor belt.

The position of the lower (rear) crossbar and of the upper (forward) support bar relative to the curved surface of the conveyor belt in the overhang region should be fixed to maintain the desired helical engagement of the separate courses of scraper elements against the curved surface of the conveyor belt. Additionally, since lump projections are generally localized rather than being uniformly distributed across the interface of the belt and drums, the overall scraper assembly preferably should not have a rotational axis; rotation of the entire scraper assembly would accomodate bulges in the conveyor belt, but would also promote planing rather than cleaning engagement during forward operation.

SUMMARY OF THE INVENTION

In keeping with the constraint that the nominal (at rest) spacing of the front (forward) crossbar be maintained at a close separation distance relative to the conveyor belt, that the position of the overall scraper assembly should be fixed relation to the curved belt surface in the overhang region, and in view of the desire to accomodate bulges or lumps formed in the surface of the conveyor belt as a result of a reversing belt condition, and subject to the constraint that the lower (rear) crossbar should be located far enough from the tangent point of the belt and pulley to allow a lump to travel by it without causing damage during a reversing belt condition, a scraper assembly is provided in which the upper (forward) crossbar support is articulated or segmented, with the separate crossbar portions being independently rotatable from a nominal resting position in which the associated scraper member is held in helical engagement with the conveyor belt, and the fastener end portion of the segmented crossbar is maintained at the appropriate nominal spacing (at rest). The segmented crossbar portions are pivotedly mounted onto an axle and are rotatable through an arc of approximately 90°, thereby permitting each segmented crossbar portion to move outwardly away from the surface of the conveyor belt to allow passage of the lump, bulge or protrusion, thus avoiding damaging contact between the protruding conveyor belt and the crossbar.

Because the designated spacing for the upper (forward) crossbar portion is relatively small (¾") (20 mm), it is apparent that a lump or bulge of comparable size or larger will be seized or obstructed by the crossbar. The upper and lower crossbars preferably should remain closely spaced whereby the scraper member is maintained in helical engagement with the belt in the curved overhang region of the pulley drum. With the lump or bulge traveling in reverse, that is, rising upwardly along the face of the pulley drum, the resilient scraper members yield outwardly and the segmented crossbar portion rotates outwardly to allow passage of a lump or bulge in the conveyor belt. After the bulge or lump has traversed the scraper zone, the segmented crossbar portions which had been deflected outwardly away from the protruding conveyor belt are returned to the nominal, resting position in response to the tension spring force developed within the associated scraper member. According to this arrangement, the correct orientation of the scraper members in helical engagement along the curved portion of the conveyor belt in the overhang region is preserved, and reversing conditions are accomodated without risk of damage to the conveyor belt or to the scraper frame crossbars.

The superior features and advantages of the present invention will be further appreciated by those skilled in the art upon reading the detailed description as follows in conjunction with the attached drawings.

DETAILED DESCRIPTION OF THE PREFERRED EMBODIMENT

Figure 1:
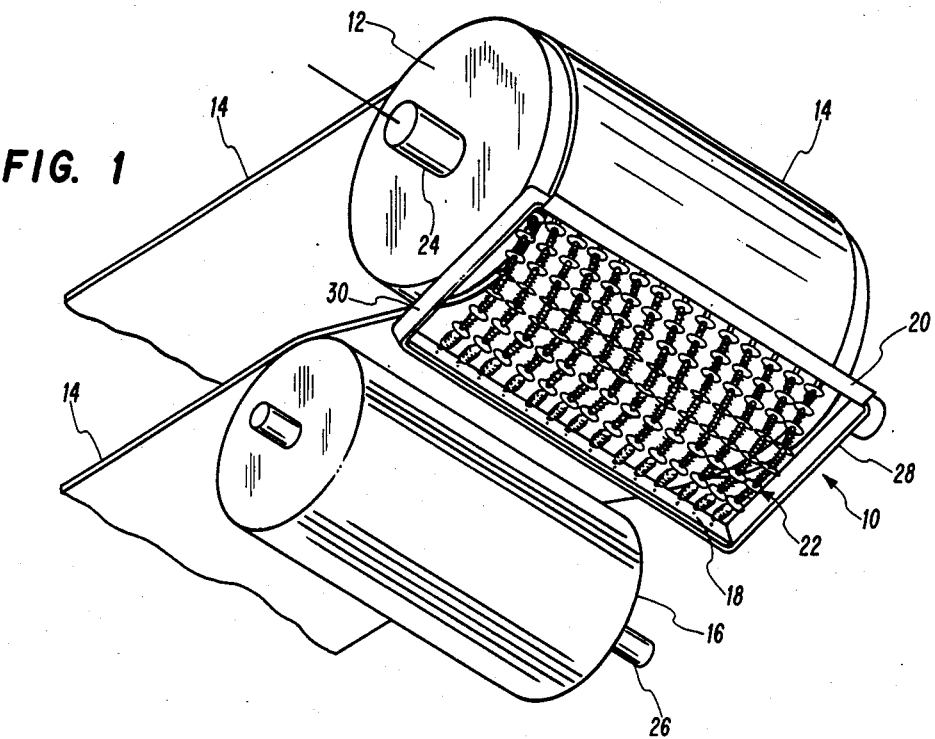
FIG. 1 is a perspective underneath view of a head pulley drum of a conveyor belt assembly, illustrating one form of a conveyor belt cleaning device in operation.

In the description which follows like parts are indicated throughout the specification and drawings with the same reference numerals, respectively. The drawings are not necessarily to scale and certain parts have been exaggerated to better illustrate details of the present invention.

Figure 2:
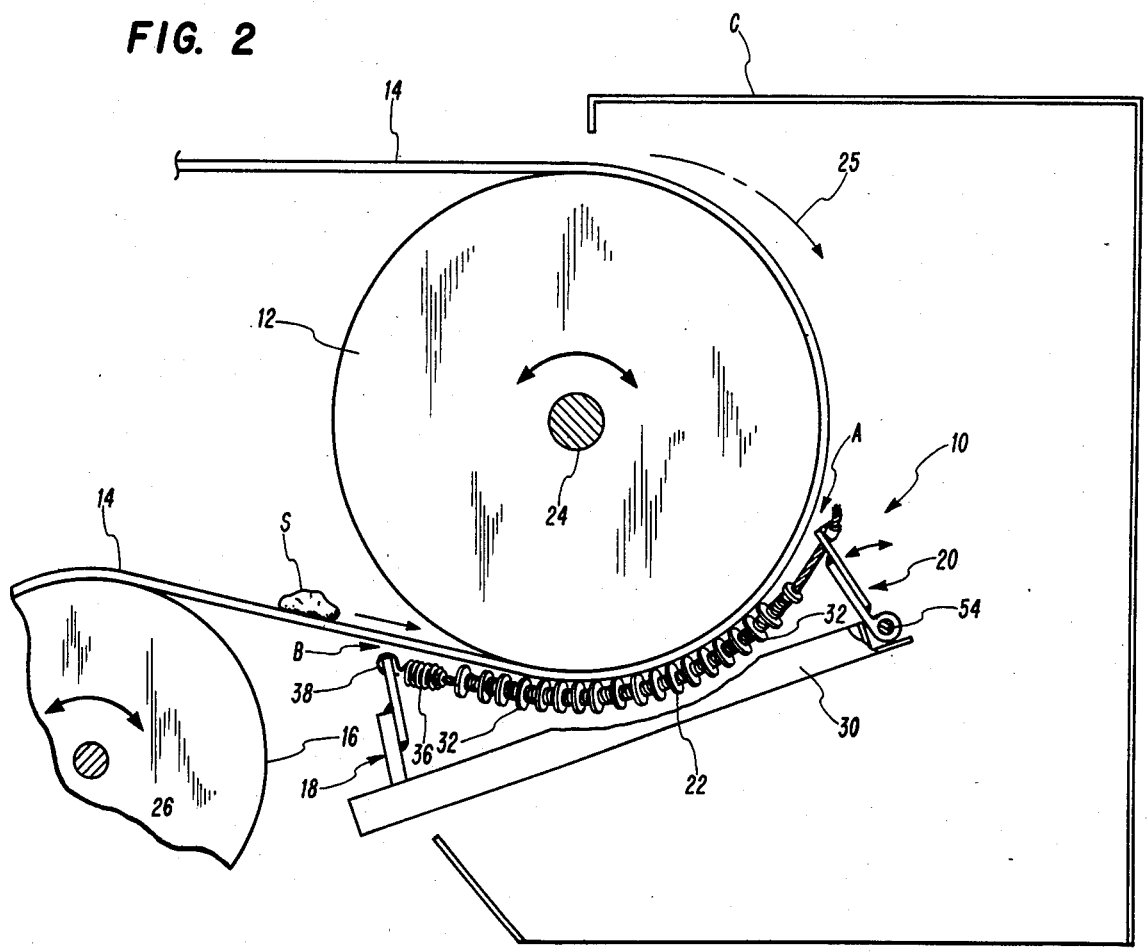
FIG. 2 is a side elevation view of the same conveyor belt cleaning device as used in connection with a discharge chute.

Referring now to FIGS. 1 and 2 of the drawings, a conveyor belt cleaning assembly generally indicated by the numeral 10 is located beneath the overhang of a head pulley drum 12 supporting a conveyor belt 14 passing there around. The conveyor belt 14 is an endless flexible belt, operating over drive, tail-end and bend pulleys 16, and over belt idlers or a slider bed. The conveyor belt 14 is suitable for handling a variety of materials in a wide range of particle sizes over long distances, up and down slopes.

For simplicity of illustration, the supporting framework and structure for the conveyor belt cleaning assembly 10 have been omitted from the accompanying sketches. However, support means are provided for two parallel transversely extending crossbars 18,20 which form the main supports for an array of belt cleaning devices 22 in the cleaning assembly 10. It will be understood that the head pulley drum 12 and bend pulley 16 are mounted on shafts 24,26 respectively, which are supported at opposite ends for rotation on bearings in the usual manner.

The uppermost crossbar 20 is located inwardly of the overhang portion of the head pulley drum so that conveyed material, and in particular lumps thereof, will not become wedged between the belt surface and the bar 20 when traveling along the discharge path within a discharge chute C as indicated by the arrow 25 (FIG. 2). The lower support bar 18 is located substantially beneath the axis of rotation of the head pulley drum 12 and a small distance away from the belt surface itself. The crossbars 18,20 are stabilized at each end by braces 28,30. The frame of the scraper assembly 10 is rigidly mounted onto the conveyor structure, with its orientation relative to the curved surface of the conveyor belt in the overhang region being fixed, thereby preserving the helical engagement of the flexible cleaning devices 22. The lower crossbar 18 and upper crossbar 20 are dimensioned and spaced appropriately whereby the upper spacing A between the leading edge of the crossbar 20 with respect to the curved surface of the conveyor belt is about ¾" (20 mm) clear of the belt surface and the back crossbar 18 spacing B is about 1" (25 mm) clear of the belt surface.

The line between the crossbars 18,20 intersects the arcuate surface of the conveyor belt 14 and thus a flexible conveyor belt cleaning device is required. Resilient cleaning action is provided by a flexible cleaning device 22 composed of a series of scraper elements 32 of a wear resistant material such as tungsten carbide or hard steel alloys movably threaded onto a high strength flexible tension member 34. The tension member 34 is preferably a stainless steel cable.

The flexible cleaning device 22 includes at least one anchor spring 36 connected by a hook fastener 38 through an eyelet 39 formed in the lower crossbar 18. Each scraper element 32 is closely fitted about the tension member 34, but is slightly rotatable with respect thereto. Moreover, each scraper element is movable with respect to the tension member so that it will deflect or twist and yield to a surface irregularity without snagging or causing damage.

Figure 6:
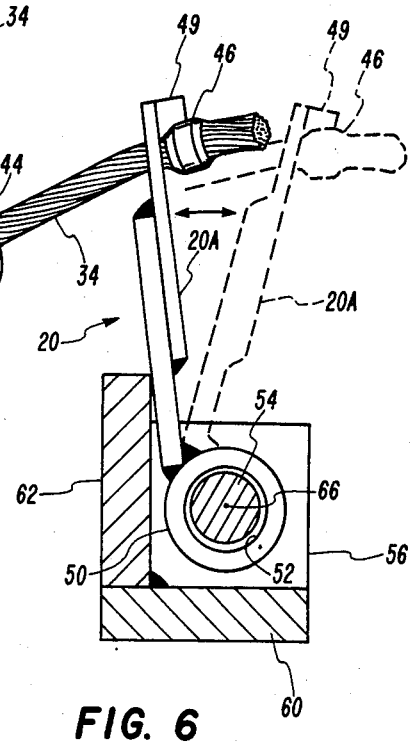
FIG. 6 is an elevation view, partly in section, of a segmented crossbar member showing attachment of the upper end of a scraper member; and, FIG. 7 is a perspective view of a segmented crossbar portion mounted for rotation onto an axle.
Figure 7:
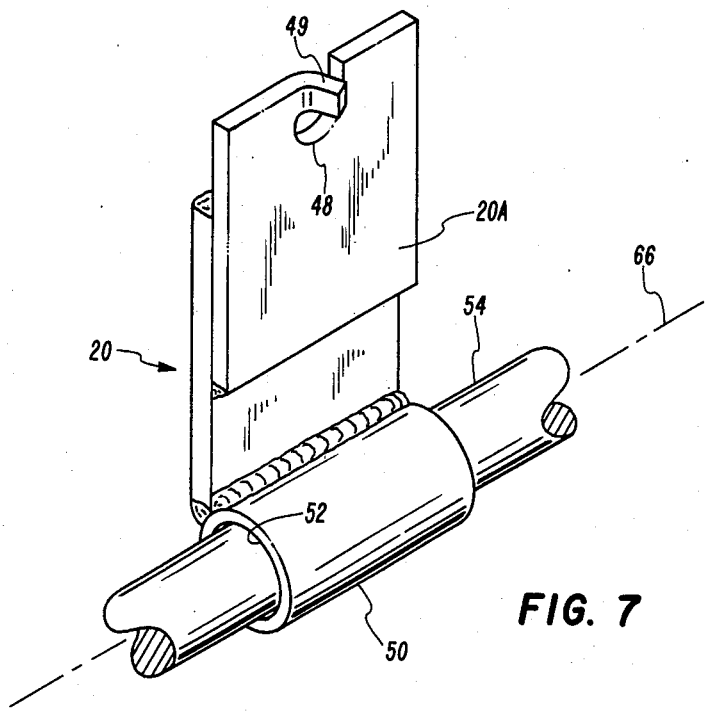

The scraper elements 32 are separated by resilient spacer coil elements 40, preferably in the form of a stainless steel coil spring. The flexible tension member 34 is threaded through each scraper disk 32 and through each spacer coil 40, with the spacer coil 40 at the extreme left end of the tension member being jammed against the anchor spring 36. The anchor spring 36 is retained onto the tension member 34 by a clamp band 42. The scraper element 32 and spacer coils 40 are continuously compressed against each other in response to the force developed when the opposite end of the scraper member is attached to the upper crossbar assembly 20, as can best be seen in FIGS. 2 and 6.

The desired amount of compression force is developed by compressing the spacer coils 40 and scraper elements 32 between the clamp band 42 at the lower end of the scraper assembly, and a clamp band 44 at the upper end of the assembly. The lower clamp band 42 serves as a retainer for the anchor spring 36, while the upper clamp band 44 serves as a retainer for the terminal scraper element 32. Each clamp band is disposed in crimped engagement with the tension member 34 at opposite ends, respectively. According to this arrangement, the scraper element 32 and compression coils 40 undergo compressive loading at all times, whereby each scraper element 32 automatically returns to the upright scraping position relative to the conveyor belt after being defelected by a conveyor belt surface irregularity such as a protruding fastener.

Any suitable number of conveyor belt cleaning devices 22, as just described, may be provided to extend across the entire width of a conveyor belt. In this particular embodiment of the invention there are illustrated fourteen such scraping members, but it will be appreciated that fewer or more such devices, as desired, may be utilized to good advantage, with the scraper element diameter and transverse angle of engagement being adjusted to provide complete surface coverage, according to conveyor belt widths.

In the illustrated embodiment of this invention each of the conveyor belt cleaning devices 22 has one end of the cable 34 secured to the upper transverse crossbar assembly 20. The cleaning elements of each scraper strand are held in contact with the belt surface by the cable 34 which is attached, at its other end, to the lower transverse crossbar 18 at a position laterally spaced relative to the point of attachment of the upper crossbar 18. Thus each of the conveyor belt cleaning devices 22 will follow a substantially helical path akin to a multistart thread of great pitch.

It will be understood that as a result of the spring 36 and the flexible nature of the tension member 34, each of the above described conveyor belt scraper members 22 will be held in yieldable, thrusting engagement with the surface of the conveyor belt 14 apart from its leading and trailing end portions. The conveyor belt scraping members 22, illustrated in this particular embodiment of the invention, are arranged such that they overlap in their operative positions and thereby clean the entire width of the conveyor belt apart, possibly, from the absolute edge regions.

Figure 4:
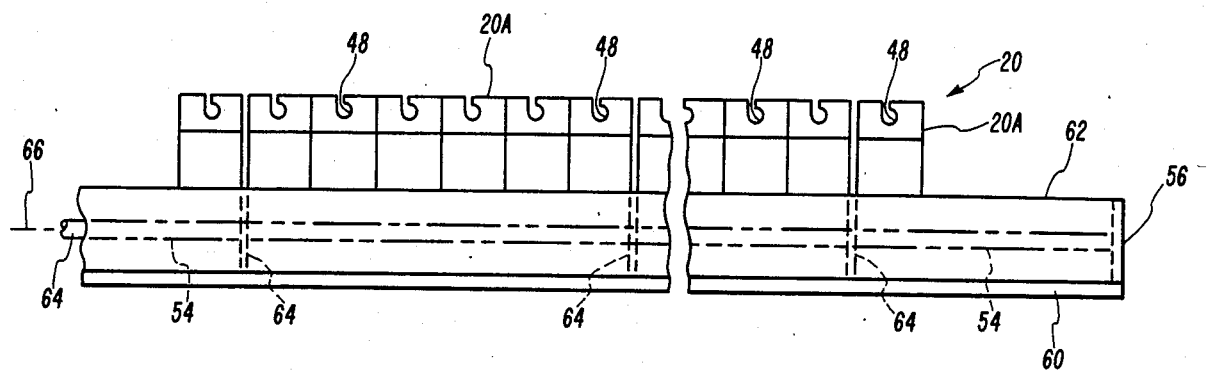
FIG. 4 is an elevation view of a segmented crossbar assembly.

The upper end of each tension member 34 is coupled to the upper support crossbar 20 by means of a ball stop 46 which is crimped about the terminal end portion of the tension member 34. The upper end portion of the tension member 34 is received in a notched opening or keyway 48 as best can be seen with reference to FIG. 4 and FIG. 6. The ball stop 46 is confined in the keyway 48 by a tang 49. The tension members 34 are cut to a preslected length determined by pulley diameter, scraper pitch and belt width. A desired amount of tension is induced within the tension members by adjusting take-up screws (not illustrated) coupled between the lower (rear) crossbar 18 and the scraper frame.

Referring again to FIG. 2, there is a possibility that a stone or other lump of material S may be carried along on the inside surface of the lower conveyor belt portion 14 and become trapped between the conveyor belt and the face of the pulley drum. The lower (rear) crossbar 18 which supports the scraper elements is located at a spacing B with respect to the conveyor tangent line to allow a large lump, for example the stone S producing a localized belt projection of 2" (50 mm), to pass over it without interference. The upper (forward) crossbar 20, on the other hand, is closely spaced relative to the face of the conveyor belt and will sustain damage to itself or will cause tearing of the conveyor belt in response to its non-yielding engagement with a large lump or other conveyor belt projection, which might occur during a reversing condition.

In keeping with the foregoing constraints regarding the desired fixed position of the scraper assembly relative to the curved portion of the conveyor belt in the overhang region, and for the purpose of accomodating bulges, lumps or other projections in the surface of the conveyor belt during operation and a reversing condition, the scraper assembly 10 is provided with an articulated or segmented crossbar assembly 20, with individual crossbar portions 20A being independently rotatable from a nominal resting position in which the associated scraper member 22 is held in helical engagement with the conveyor belt, and the fastener end portion of the segmented crossbar is maintained at the appropriate nominal spacing at rest as indicated by the spacing A.

The segmented crossbar portions 20A are welded onto a cylindrical sleeve 50. Each cylindrical sleeve has a bore 52 in which an axle 54 is received. The axle 54 is supported at its opposite ends by end plates 56,58. The end plates 56,58 are welded onto the plates 60, 62 which are welded together to form a right angle channel strip. The axle 54 is supported along its length by gussets 64 which are spaced on approximate 18" (450 mm) centers across the length of the channel strip.

Figure 3:
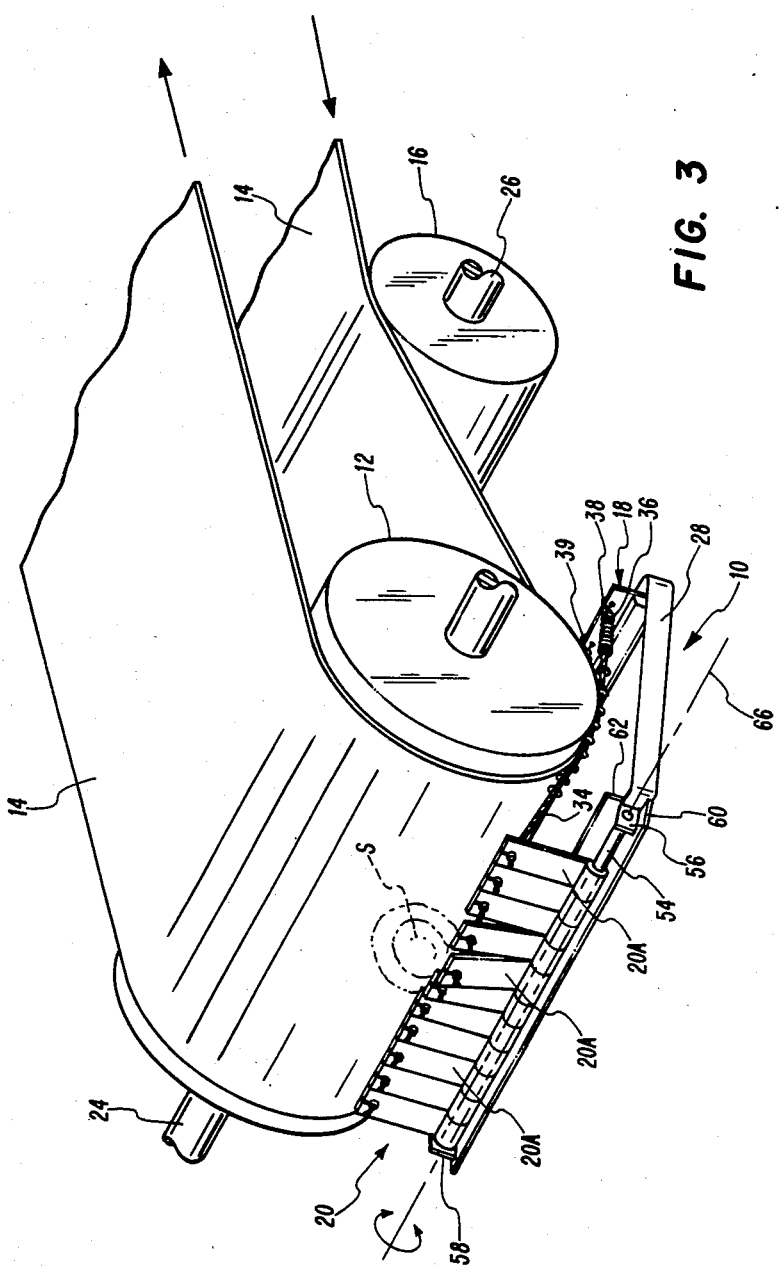
FIG. 3 is a perspective view of the scraper device shown in FIG. 2 which illustrates its operation in a reversing condition.

According to the foregoing arrangement, each segmented crossbar portion 20A is free to rotate away from the conveyor about the axis 66 of axle 54 through an angle of approximately 90° in response to engagement with a lump or other projection during a reversing belt condition. Referring to FIG. 3, it will be seen that three of the segmented crossbar portions 20A are deflected outwardly as the lump S traverses the scraper zone during a reversing belt condition. Because the segmented crossbar portions 20A yield outwardly, damaging engagement between the crossbar assembly and the conveyor belt is avoided.

After the bulge or lump has traversed the scraper zone, the segmented crossbar portions 20A which previously had been deflected outwardly away from the protruding conveyor belt are returned to the nominal, resting position in response to the spring force developed within the scraper member by tension spring 36. According to this arrangement, the correct orientation of the scraper assembly 10 in which the individual scraper members 22 are held in helical engagement along the curved portion of the conveyor belt in the overhang region is preserved, and reversing conditions are accomodated without risk of damage to the conveyor belt or to the scraper frame crossbars.

Figure 5:
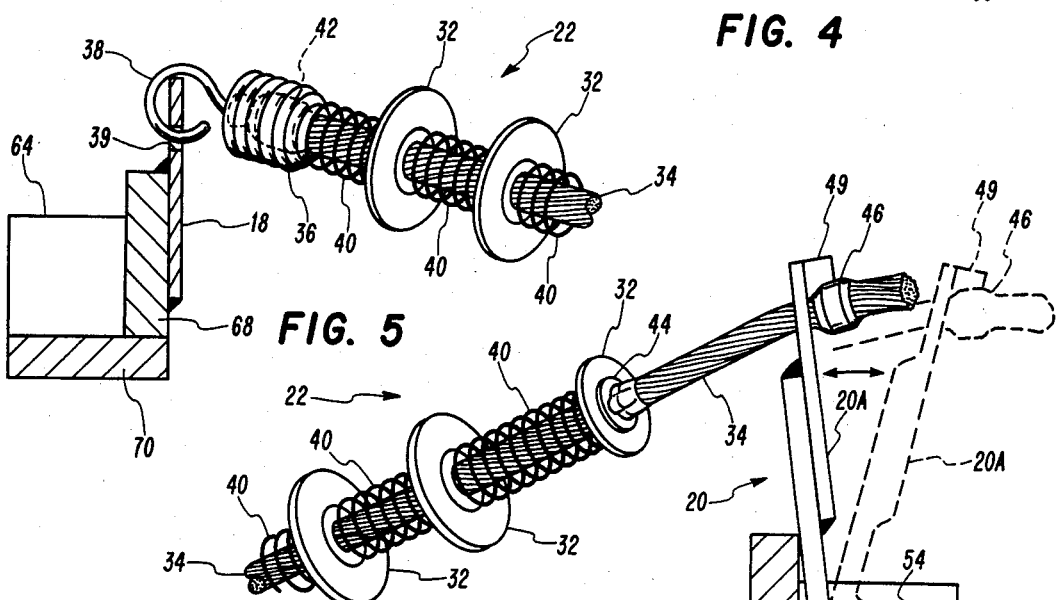
FIG. 5 is an elevational view, partly in section illustrating the attachment of the lower end of a scraper member.

Referring again to FIG. 5, the lower crossbar 18 is secured by bolt fastener onto a right angle channel strip 68. The installed tension force within the tension members 34 can be increased as desired by adjusting take-up screws (not illustrated). The channel bracket 68 is stabilized by gusset plate 64 which is welded onto a base plate 70.

Although the invention has been described with reference to a specific embodiment, and with reference to a specific reversing belt condition, the foregoing description is not intended to be construed in a limiting sense. Various modifications of the disclosed embodiment as well as alternative applications of the invention will be suggested to persons skilled in the art by the foregoing specifications and illustrations. For example, other scraper/tension member combinations can be incorporated and used to good advantage with the segmented crossbar structure. It is therefore contemplated that the appended claims will cover any such modifications or embodiments that fall within the true scope of the invention.

What is claimed is:

1. A belt scraper assembly for use in combination with a conveyor belt of the type driven by a pulley drum, said belt scraper assembly including first and second crossbars adapted to be mounted in first and second operative positions about the overhang region of the pulley drum, respectively; an array of segmented crossbar portions movably mounted onto a selected one of said crossbars, each crossbar portion being mounted for rotation toward and away from said pulley drum; stop means mounted on said selected crossbar for limiting movement of said crossbar portions toward the pulley drum; an array of elongated, flexible scraping members supported between said first and second crossbars for engagement with the curved surface of a conveyor belt in the overhang region of a pulley drum, each scraping member having one end portion coupled to one of said segmented crossbar portions and the other end portion coupled to the other of said crossbars and, bias means coupled to each scraping member for maintaining each scraping member in yieldable, thrusting engagement with the curved surface of a conveyor belt in the pulley drum overhang region.

2. A scraper assembly for cleaning a conveyor belt in a region where the conveyor belt is in contact with the curved surface of a pulley drum comprising, in combination:
   first and second crossbar support means adapted to be mounted in first and second operative positions, respectively, relative to the pulley drum in the contact region;
   an elongated, flexible scraping member coupled between the first and second crossbar support means for engaging the curved surface of the conveyor belt in the contact region, said scraping member engaging the conveyor belt along an arcuate path when said crossbar support means are mounted in the respective operative positions;
   bias means coupled to said scraping member for maintaining said scraping member in yieldable, thrusting engagement with the curved surface of the conveyor belt in the contact region;
   one of said crossbar support means having a crossbar portion mounted for rotation toward and away from the pulley drum and having a stop member disposed in the rotational path of said crossbar portion for limiting rotational movement of said crossbar portion toward said drum; and,
   said crossbar portion being movable from a resting position of engagement against said stop member, with said scraping member yieldably engaging the conveyor belt during forward operation thereof, to an outwardly deflected positoin relative to the stop member and conveyor belt to allow a lump, bulge or other such conveyor belt protrusion to travel by said crossbar portion thereby avoiding damaging contact between the crossbar portion and the conveyor belt during reverse operation thereof.

3. A conveyor belt scraper assembly as defined in claim 2, said crossbar support means including an axle, and said crossbar portion having a sleeve with a cylindrical bore, with said axle being received within the bore of said sleeve.

4. A conveyor belt scraper assembly as defined in claim 2, said stop member comprising a plate mounted onto the crossbar support means and projecting into the path of rotation of said crossbar position.

5. A conveyor belt scraper assembly as defined in claim 2, said crossbar portion comprising a plate having a keyway opening and a tang member adjacent said opening, said keyway and tang member receiving and engaging an end portion of said elongated flexible scraping member.

6. A conveyor belt scraper assembly comprising, in combination:
   a rectangular support frame having first and second parallel support bars;
   an axle mounted onto a selected one of said support bars in parallel relation therewith;
   a plurality of crossbar portions mounted on said axle for rotation with respect thereto;

stop means mounted onto said selected support bar and extending along said axle, said stop means projecting into the path of rotation of each crossbar portion; and, a plurality of flexible scraping members coupled between said first and second support bars, each flexible scraping member including a scraper portion and a tension spring connected in mechanical series relation with said scraper portion, one end of each flexible scraping member being attached to one of said crossbar portions, and the other end of said flexible scraping member being attached to the other support bar.

* * * * *